United States Patent [19]

Riollet et al.

[11] Patent Number: 4,500,070
[45] Date of Patent: Feb. 19, 1985

[54] VALVE FOR ADJUSTING THE RATE OF FLOW OF A GASEOUS FLUID

[75] Inventors: Gilbert Riollet, Paris; Raymond Bessay, Belfort, both of France

[73] Assignee: Alsthom-Atlantique, Paris, France

[21] Appl. No.: 407,411

[22] Filed: Aug. 12, 1982

[30] Foreign Application Priority Data

Aug. 25, 1981 [FR] France .................. 81 16204

[51] Int. Cl.³ .............................. F16K 39/04
[52] U.S. Cl. ............................ 251/282; 251/324
[58] Field of Search ............ 251/282, 319, 324; 137/505.18

[56] References Cited

U.S. PATENT DOCUMENTS 1,752,439 4/1930 Larner .
2,087,037 7/1937 McCarthy ........................ 251/324
2,091,699 8/1937 Bryant .

FOREIGN PATENT DOCUMENTS 0023172 1/1981 European Pat. Off. .
1292129 8/1982 France .
694919 7/1953 United Kingdom .

Primary Examiner—Martin P. Schwadron
Assistant Examiner—Sheri Novack
Attorney, Agent, or Firm—Sughrue, Mion, Zinn, Macpeak and Seas

[57] ABSTRACT

Valve for adjusting the rate of flow of a gaseous fluid, comprising a valve body (1) having a side inlet (2) and an outlet (3), an obturator (10) movable in translation within a housing (4) and bearing on a seat (18) when the outlet (3) is shut off, said housing (4) being fastened within the body (1) by means (5) located externally of the fluid flow path. The mobile obturator (10) has a front part (9) in the form of a hollow cylinder surrounding with limited clearance a nose-piece (7) attached to the housing (4) by rigid arms within the housing (4). The front surface (17) of the nose-piece (7) extended by the front surface (16) of the obturator (10) and the front part (6) of the housing (4) are of an aerodynamic shape. Reduction of the effects of unsteady forces on the obturator across the full range of openings without head losses when fully open.

2 Claims, 2 Drawing Figures

4,500,070

VALVE FOR ADJUSTING THE RATE OF FLOW OF A GASEOUS FLUID

The present invention concerns a valve for adjusting the rate of flow of a gaseous fluid comprising a valve body having a side fluid inlet and a fluid outlet, and obturator fitted with a stem actuated by operating means and sliding within a housing fastened within the body by means located externally of the fluid flow path between the inlet and the outlet, said obturator having a front part which may be applied against a seat so as to shut off said outlet and a rear part within the housing subjected to a pressure comparable with the pressure of the fluid at the inlet.

Such valves are used to adjust the fluid flowrate across the full range from 0 to 100%.

For this reason the outlet pressure P1 may vary relative to the inlet pressure Po in a ratio from 0 to 1.

In consequence, in the low flowrate zone, the flow in the valve is supersonic. For a certain position of the obturator it is sonic. Beyond, it becomes subsonic.

For all these rates of flow there are many unsteady and asymmetrical excitation forces acting on the obturator and likely to lead, should resonance occur, to breakage of components. These forces are due notably to periodic separation of the fluid jets which beat at some times on the fixed parts and at others on the obturator, recompression shock waves impinging on the obturator, and unstable flow separation due to local curvature and to excessively accentuated divergences in the flowlines.

SUMMARY OF THE INVENTION

The present invention provides for minimising unsteady forces on the obturator throughout its full range of travel while ensuring a low level of head loss when fully open, that is to say during normal operation of the installation. The adjustment valve in accordance with the present invention is characterised in that the front part of the obturator is in the form of a hollow cylinder surrounding with limited clearance a nose-piece attached to the housing by rigid arms within said housing.

Thus instabilities in the flow at the various openings generate forces of which the majority are taken by the nose-piece, which may be fixed as rigidly as necessary, whereas the obturator, which can never be of great mechanical strength by virtue of its stem, is subject to little force, apart from the small lateral portion projecting from the housing. The attachment of the nose-piece to the housing by arms within said housing does not disturb the fluid flow and does not cause any head loss.

In a preferred embodiment of the invention providing for minimising head losses when fully open, the front surface of the nose-piece is of an aerodynamic shape which extends the front part of the housing and the front surface of the obturator.

The invention will now be described in more detail with reference to two specific embodiments given by way of non-limiting example and shown in the accompanying drawings.

DESCRIPTION OF PREFERRED EMBODIMENTS

Figure 1:
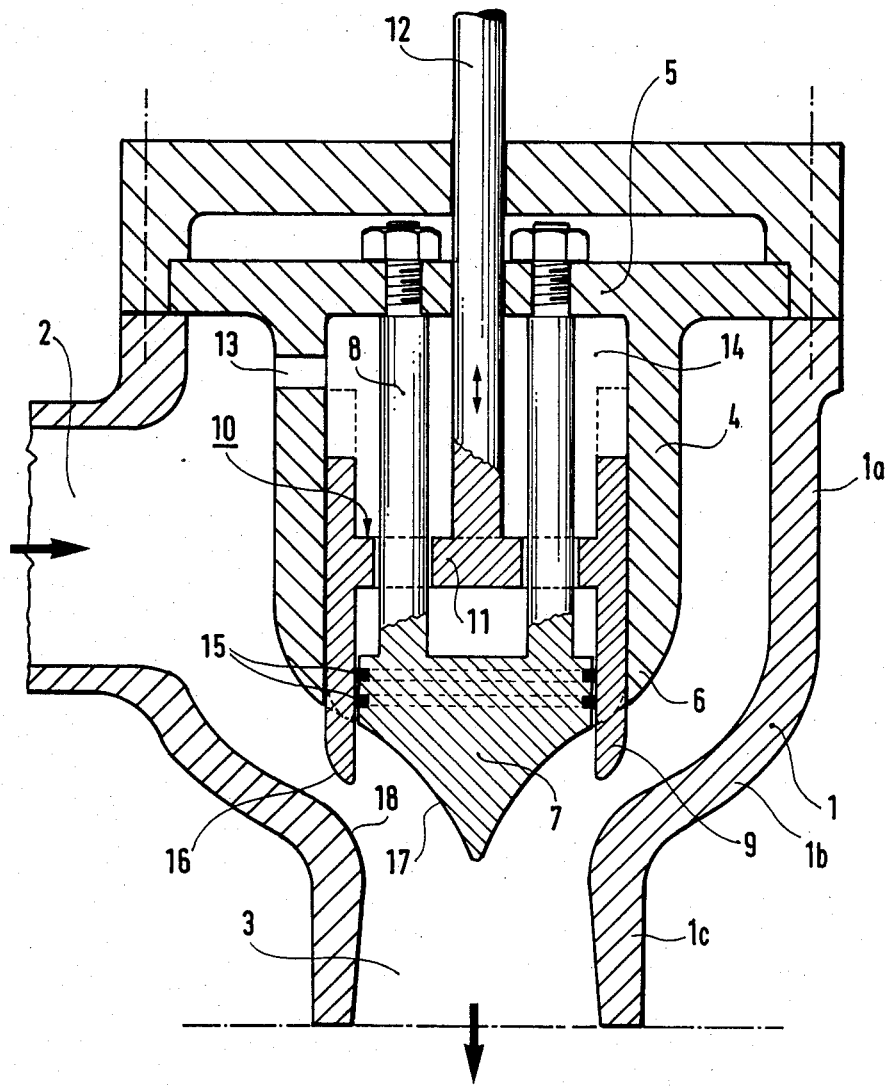
FIG. 1 shows a first embodiment of the valve in accordance with the invention.

The valve shown in FIG. 1 comprises a valve body 1 having a cylindrical form including a large diameter inlet portion 1a leading to a small diameter outlet portion 1c via tapering portion 1b. Inlet portion 1a has a radial, side gaseous fluid inlet 2 and an axial fluid outlet 3 defined by body outlet portion 1c, the axis of inlet 2 being perpendicular to the axis of outlet 3.

Within inlet portion 1a of body 1 is a cylindrical housing 4 closed by a plate 5 attached to body 1 outside the flow path between inlet 2 and outlet 3. Thus the perimeter of plate 5, acting as fixing means, does not disturb the flow of fluid and does not cause any head loss.

The front part 6 of housing 4 facing outlet 3 is extended by a conical, streamlined nose-piece 7 linked by rigid rods 8 to plate 5. Between front part 6 of housing 4 and nose-piece 7 is an annular space through which passes the front part 9 of an obturator 10. This front part is in the shape of a hollow cylinder. Obturator 10 comprises a center plate 11 apertured to permit the passage of rods 8 and coupled at its center to a stem 12 which passes out of body 1 and is connected to operating means (actuator or otherwise) not shown.

Obturator 10, nose-piece 7 and housing 4 are substantially symmetrical relative to a vertical axis which is also the axis of symmetry of outlet 3.

The wall of housing 4 is formed at the top with openings 13 as a result of which the internal upper part chamber 14 of housing 4 above obturator 10 is at a pressure comparable with the pressure Po at inlet 2.

Between nose-piece 7 and the internal part of the cylindrical front part 9 of obturator 10 are disposed sealing means 15.

Leakage of fluid from the interior of the housing towards outlet 3 at pressure P1 is less than the flowrate of fluid entering through openings 13.

The front surface 16 of obturator 10 when in the raised (open) position forms with the front surface 17 of nose-piece 7 and front part 6 of housing 4 an aerodynamic surface facing the adjacent part of the body adjacent the outlet. This shape has been selected so that the head losses when fully open are minimal (without reference to effects on the stability of the obturator under abnormal operating conditions).

When the obturator is in the lowered (closed) position, it bears on a seat 18 defined by body tapered portion 1b and blocks any escape of fluid, the outlet pressure then being null.

Figure 2:
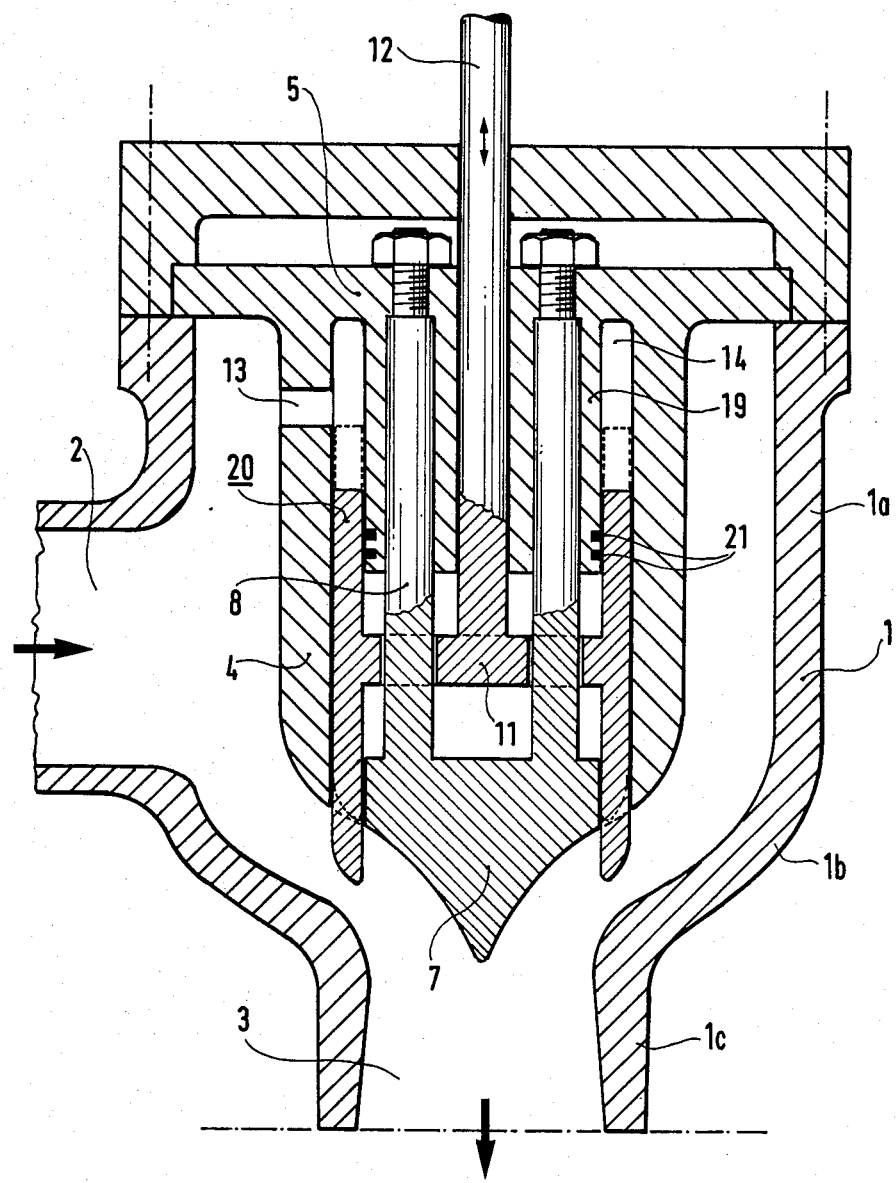
FIG. 2 shows a second embodiment of the valve in accordance with the invention.

In FIG. 2, the components of the valve comparable with those in FIG. 1 are indicated by the same reference numerals.

Inside housing 4 beneath plate 5 is disposed a solid cylinder 19 through which pass only rods 8 attaching nose-piece 7 and the movable stem of the obturator. The part 20 of obturator 10 in the form of a hollow cylinder situated above plate 11 of the obturator is contained between the internal wall of housing 4 and the external wall of cylinder 19. Sealing means 21 are disposed on cylinder 19 so that the pressure in the upper part chamber 14 of housing 4 fed by openings 13 is maintained at the value Po.

By maintaining the pressure in the upper part chamber 14 of housing 4 at Po all force may be removed from stem 12 when the obturator is closed since the pressure difference between the top and bottom of obturator 10 is then Po (ignoring leaks). Moreover, by virtue of the presence of sealing means 21 and the limited clearance between nose-piece 7 and obturator 10, the fluid in the space between nose-piece 7 and obturator 10 is not agitated.

We claim:

1. A valve for adjusting the rate of flow of a gaseous fluid, said valve comprising a valve body (1) of tubular form including a large diameter inlet portion (1a) leading to a small diameter outlet portion (1c) via tapered portion (1b), said large diameter inlet portion having a radial side fluid inlet (2) at pressure Po, said small diameter outlet portion (1c) forming an axial end fluid outlet (3), a cylindrical housing (4) fastened within the large diameter inlet portion (1a) of said body (1) by means (5) located externally of the fluid flow path between the inlet (2) and the outlet (3), and obturator (10) fitted with a stem (12) actuated by operating means and slidably mounted within said housing, said obturator (10) having a front part (9) engageable against a seat (18) defined by said tapered portion (1b) so as to shut off said outlet (3) and a rear part within the housing (4), said cylindrical housing forming a chamber, means subjecting said chamber to a pressure comparable with the pressure Po of the fluid at the inlet (2), the improvement wherein said housing (4) terminates in a conical streamlined nose-piece (7) within said tapered portion (1b) of said valve body, said nose-piece (7) having a tip within the small diameter outlet portion (1b) of said valve body, such that said nose-piece (7) forms with said valve body tapered portion (1b) a narrow conical flow passage leading to said outlet (3), and wherein the front part (9) of said obturator (10) is in the form of a hollow cylinder surrounding with limited clearance said nose-piece (7) and with limited clearance within said cylindrical housing (4), and said nose-piece (7) is attached to the housing (4) by rigid arms (8) within said housing (4), whereby unsteady forces acting on said obturator by fluid flow from the inlet to the outlet are minimized through the full range of travel of the obturator between open and closed positions, while insuring a low level of fluid flow head loss when the valve is fully open.

2. A valve according to claim 1, wherein the front surface (17) of the nose-piece (7) is of an aerodynamic shape which extends the front part 6 of the housing (4) and the front surface (16) of the obturator (10).

* * * * *